United States Patent [19]
Xu et al.

[11] Patent Number: 5,995,550
[45] Date of Patent: Nov. 30, 1999

[54] METHOD AND APPARATUS FOR DECODING A CODED SIGNAL IN A COMMUNICATION SYSTEM

[75] Inventors: Hua Xu, Lake Zurich; Fuyun Ling, Hoffman Estates, both of Ill.

[73] Assignee: Motorola, Inc., Schaumburg, Ill.

[21] Appl. No.: 08/863,405

[22] Filed: May 27, 1997

[51] Int. Cl.⁶ ............... H04L 23/02; H04L 5/12; H04L 27/22; H03D 1/00
[52] U.S. Cl. .......... 375/262; 375/265; 375/206; 375/341; 371/43.1; 371/43.4; 371/43.6; 371/43.7; 371/43.8; 370/335; 370/342; 370/479
[58] Field of Search ............... 375/262, 265, 375/341, 200, 206; 371/43.1, 43.4, 43.3, 43.6, 43.7, 43.8; 370/335, 342, 479

[56] References Cited

U.S. PATENT DOCUMENTS

| | | | |
|---|---|---|---|
| 4,660,214 | 4/1987 | Pahlavan et al. | 375/262 |
| 5,111,483 | 5/1992 | Serfaty | 375/341 |
| 5,265,127 | 11/1993 | Betts et al. | 375/341 |
| 5,272,726 | 12/1993 | Furuya et al. | 375/341 |
| 5,343,500 | 8/1994 | Betts et al. | 375/262 |
| 5,349,608 | 9/1994 | Graham et al. | 375/341 |
| 5,363,413 | 11/1994 | Vos | 375/340 |
| 5,450,453 | 9/1995 | Frank | 375/200 |
| 5,471,500 | 11/1995 | Blaker et al. | 375/340 |
| 5,486,956 | 1/1996 | Urata | 360/65 |
| 5,488,374 | 1/1996 | Frankot et al. | 342/25 |
| 5,504,784 | 4/1996 | Niyogi et al. | 375/341 |
| 5,524,027 | 6/1996 | Huisken | 375/341 |
| 5,608,763 | 3/1997 | Chiasson et al. | 375/332 |

*Primary Examiner*—Stephen Chin
*Assistant Examiner*—Michael W. Maddox
*Attorney, Agent, or Firm*—Sayed Hossain Beladi

[57] ABSTRACT

The present invention is a method and apparatus for decoding a coded signal in a communication system. The coded signal is processed through digital signal processing to produce decision metrics representing the coded signal, and the metrics are scaled according to a soft-limiting function before being received by a decoder for decoding the coded signal. The soft-limiting function is a piecewise linear function, a piecewise nonlinear function, or a combination of piecewise linear and nonlinear functions. The soft-limiting, in the alternative, is performed on a result of a weighting function performed, in parallel of the decision metrics, on the coded signal. The result of the soft-limiting is then multiplied with a result of the decision metrics prior to the decoder. The decoder may a Viterbi decoder while the communication system may be a Code Division Multiple Access (CDMA) communication system.

10 Claims, 2 Drawing Sheets

—PRIOR ART—

METHOD AND APPARATUS FOR DECODING A CODED SIGNAL IN A COMMUNICATION SYSTEM

FIELD OF THE INVENTION

The present invention relates to decoding a communication signal in a communication system, and more particularly, to a method of soft limiting in decoding the communication signal.

BACKGROUND OF THE INVENTION

Digital Signal Processing (DSP) of information in a communication system is implemented by fixed point computation. Preferably, the DSP application is implemented by floating point calculation, however, such implementation in communication systems is neither cost effective nor feasible due to requirements of performing extensive computations. A fixed-point DSP implementation produces errors in the results; often times, the errors have significant adverse effects on the quality of the DSP results.

In a fixed-point DSP computation, the size of the memory registers determines the range of values that could be represented. If the magnitude of a computed result is larger than the range of the registers, the magnitude is accordingly limited. This operation is mathematically and graphically represented by a block 101, labeled as Hard Limiting, in FIG. 1. The magnitudes of the input signal 102 and the output signal 103 are represented respectively by "x" and "f(x)". It is clear that output signal 103 would have the same value for any input signal having a value larger than K, where K is the largest value that can be represented by the DSP register.

In a Code Division Multiple Access (CDMA) communication system, a CDMA receiver 100, shown in FIG. 1, receives a signal 106 that carries coded information. The code is a series of symbols. The receiver 100 determines the series of symbols for decoding signal 106, and produces decoded information signal 110. At first, the signal 106 is demodulated by a demodulator 107. Then, the energy contained under each symbol is estimated by a block 105, labeled as decision metrics 105. In the block 105, a metric corresponding to the estimated energy is assigned to each symbol. The decoder in such a receiver, like a Viterbi decoder 104, compares the symbols' assigned metrics of at least two symbols for determining the series of symbols which formed the code. Once the series of symbols are determined, Viterbi decoder 104 decodes the signal and produces decoded information signal 110.

When two symbols produce metrics beyond what the fixed point register can represent, the symbols' assigned metrics appear to have an equal value presented to the Viterbi decoder 104. This effect is shown as hard limiting and represented by block 101 between the decision metrics 105 and Viterbi decoder 104. The hard limiting condition is when the value of the output signal 103 is equal to K for all values of the input signal 102 above K. The input signal 102 is represented by "x", and output signal 103 is represented by "f(x)", as shown in FIG. 1. When hard limiting occurs, Viterbi decoder 104 compares the same energy metrics for two different symbols that may have had two different energy metrics but for the hard limiting condition. This produces erroneous results which may cause total failure of the decoding operation.

One obvious and unattractive solution for avoiding hard limiting condition which would accordingly facilitate the decoding operation is to increase the size of the fixed-point registers for having larger dynamic range. However, this solution increases the cost and complexity of the system.

Therefore, there is a need for reducing the effect of hard limiting condition due to a limited dynamic range available in fixed-point DSP operations for decoding a coded communication signal in a CDMA communication system.

DESCRIPTION OF A PREFERRED EMBODIMENT

The present invention is a method and apparatus for decoding a coded signal in a communication system. The coded signal is processed through digital signal processing to produce decision metrics representing the coded signal, and the metrics are scaled according to a soft-limiting function before being received by a decoder for decoding the coded signal. The soft-limiting function is a piecewise linear function, a piecewise nonlinear function, or a combination of piecewise linear and nonlinear functions. The soft-limiting, in the alternative, is performed on a result of a weighting function performed, in parallel of the decision metrics, on the coded signal. The result of the soft-limiting is then multiplied with a result of the decision metrics prior to the decoder. The decoder may a Viterbi decoder while the communication system may be a Code Division Multiple Access (CDMA) communication system.

Figure 1:
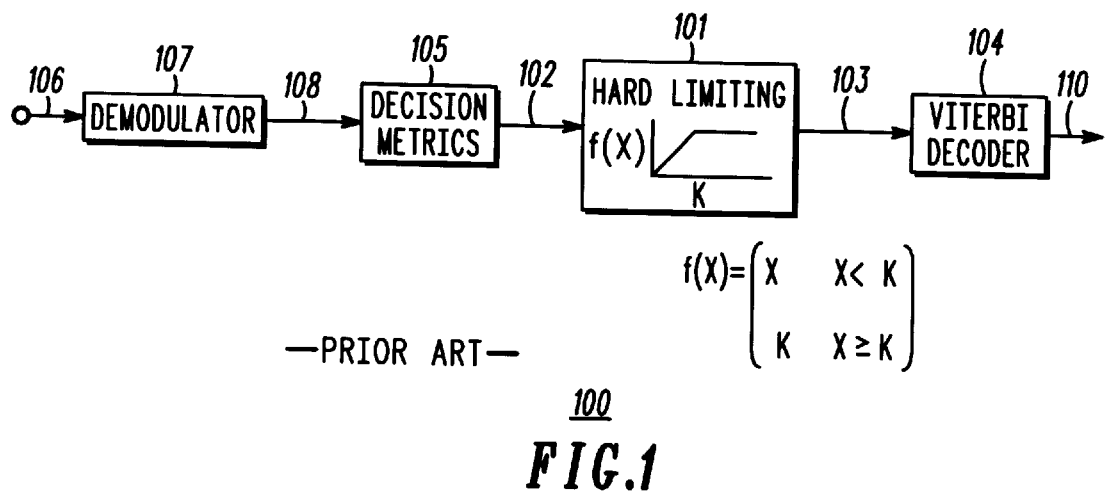
FIG. 1 represents a prior art receiver having a hard limiting condition.
Figure 2:
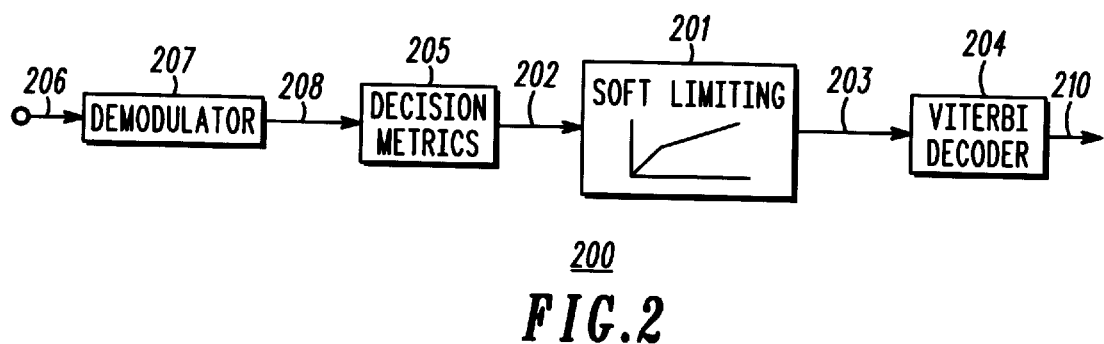
FIG. 2 represents a receiver having a soft limiting function in accordance with the invention.

With reference to FIG. 2, the hard limiting function of block 101 of FIG. 1 is replaced by the present invention shown as a block 201. The present invention is a method of soft limiting the available dynamic range. The energy content of each symbol is evaluated by a decision metrics block 205. The decision metric 205 produces metrics values that range from the low to high values. The Viterbi decoder 204 compares the symbol metrics and based on the comparison decides which series of symbols were used in the code. Accordingly, block 204 performs the decoding operation, and decoded information signal 210 is then outputted.

The block 204 performs decoding operation more efficiently if the values of the estimated energy under each symbol have been accurately estimated. For example, if the values of the estimated energy under a symbol is grossly estimated with respect to estimation of another symbol's energy, the operation of the comparison, or differentiation, by block 204 is accordingly hindered. However, gross estimation of the symbols energy at high signal to noise ratio would not hinder the performance of the decoder 204; because the signal to noise ratio is high, the estimated energy under the symbols is more of the signal than the noise. Therefore, accurate estimation of the energy under each symbol at low signal level is more critical than such an estimation at high signal level. The soft-limited metrics 203 produced by the soft limiting block 201 provide such accurate estimation in accordance with the invention.

Normally, the values of metrics are low at low signal to noise ratio level, and, conversely, high at high signal to noise ratio level. The gross estimation occurs very often when the signal 206 is at low signal to noise ratio level. Due to fixed point operation, the estimated energy metrics are more sensitive to truncation or rounding errors at low values than high values when they are outputted by decision metric 205 in FIG. 2. Therefore, the metrics at low signal level should provide better differentiation of energy estimation than at high signal level when presented to decoder 204.

The present invention functions to optimally assign the available dynamic range between low and high estimated energy metrics. The capacity of differentiation by the decoder 204 at low metrics value is given more importance than high metrics value. Accordingly, the present invention assigns more differentiation to the results of the decision metrics 205 at low than high metrics values within the dynamic range capacity; this is the effect of soft limiting function applied to the results of the decision metrics 205 as shown mathematically and graphically in the block 201 in the FIG. 2. The signal 202, represented by "x", is input to the soft limiting function 201. For all the "x" values less than or equal to M, the output function "f(x)" is equal to "x". For all the values greater than M, output function "f(x)" is scaled according to a function; in this case the function is a linear function. The scaling of the results of 205 before being presented to decoder 204 provides differentiation of the results according to the soft limiting function "f(x)" in accordance with the present invention.

The soft limiting function is not limited to a piecewise linear function. Other functions, such as a nonlinear function, are equally applicable. One variation of the soft limiting function, not shown, is a soft limiting function where the slope for values of "x" less than M is equal a value other than to one.

Figure 3:
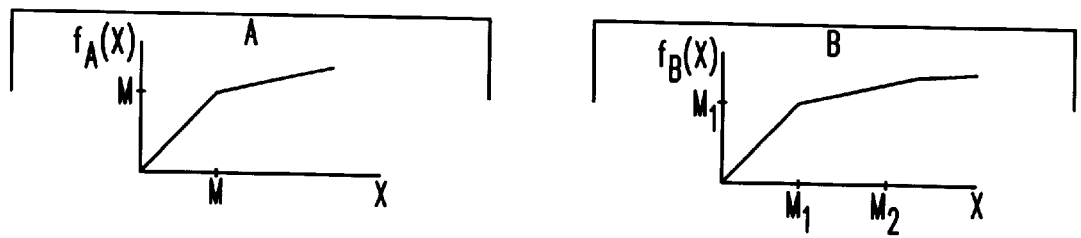
FIG. 3 represents two examples of the soft limiting function.

With reference to FIG. 3, two variations of the soft limiting function are shown. In the variation 301, the slope of the function "f(x)" is equal to 1.0 for x values from low to a value equal to M. For x values above M, the slope is controlled by a parameter α. The value of M and α are established through experimentation and the desired performance at metrics values. For example, a designer evaluates the signal to noise ratio of the coded signal at a desired frame error rate (FER) with respect to the value of M. Then based on the results and the desired performance, M is selected. Similarly, the parameter α is selected by evaluating FER with respect to possible values of α. Nevertheless, the methods of selecting the values for M and α are not limited to the given examples.

In the variation 302, points M1 and M2 indicate where the slopes of the soft limiting function "f(x)" are changing. Correspondingly, the parameters α1 and α2 define the slopes of the soft limiting function. The variation 302 is useful if the designer decides that the FER over the entire dynamic range is better served with a soft limiting function having a plurality of slopes as shown in 302. The values of M1, M2, α1, and α2 are selected based on experimentation.

Figure 4:
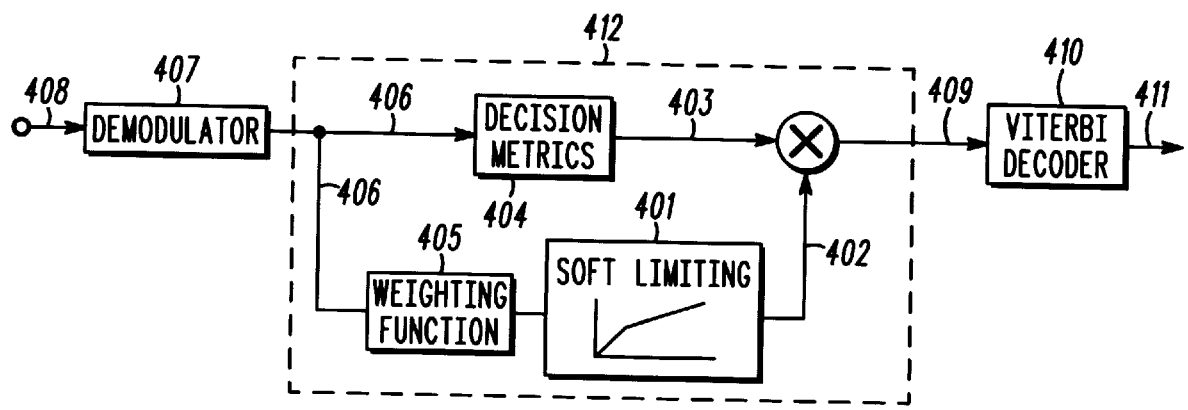
FIG. 4 represents an alternate embodiment of a receiver having a soft limiting function in a parallel path with a decision metrics function in accordance with the invention.

In accordance with an alternative embodiment of the present invention, the function of the soft limiting expression can be implemented in a parallel path before the final metrics are presented to the decoder. With reference to FIG. 4, a demodulated signal 406 is fed into decision metrics 404 and a weighting function 405. The weighting function 405 in parallel evaluates the symbols in signal 406 and assigns certain weights to the symbols as is known in the art. See U.S. Pat. No. 5,450,453 issued Sep. 12, 1995, assigned to the assignee of the present application, and incorporated herein by reference. The results of the weighting function 405 is then soft limited. The results 402, when multiplied with the metrics 403 generated by decision metrics 404, carry the net effect of the soft limiting function via signal 409. The signal 409, having the net effect of soft-limiting allows more accurate decoding at low signal level in accordance with the invention. The signal 409 is presented to the decoder 410 to provide the decoded signal.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method of decoding a coded signal in a communication system, comprising the steps of:

scaling, according to a soft-limiting function f(X), results (X) of a digital signal processing computation of said coded signal;

outputting an scaled result of said scaling step for decoding said coded signal;

wherein said soft limiting function f(X) is essentially equal to at least one of mathematical formula fA(X) and fB(X);

wherein said fA(X) is governed by:

$$fA(X) = X \qquad \text{if } X < \text{ or } = M, \text{ and}$$

$$fA(X) = \frac{X + (\alpha - 1) \cdot M}{\alpha} \quad \text{if } X > M;$$

wherein said fB(X) is governed by:

$$fB(X) = X \qquad \text{if } X < \text{ or } = M1,$$

$$fB(X) = \frac{X + (\alpha 1 - 1) \cdot M1}{\alpha 1} \quad \text{if } X > M1, \text{ and}$$

$$fB(X) = \frac{X + (\alpha 2 - 1) \cdot M2}{\alpha 2} \quad \text{if } X > M2;$$

wherein M, M1 and M2, and α, α1 and α2 are finite numbers.

2. The method as recited in claim 1 further comprising the step of determining said soft-limiting function before receiving said results (X) of said digital signal processing computation.

3. The method as recited in claim 1 further comprising the step of performing on said coded signal a decision metrics function to produce said results (X) of said digital signal processing computation.

4. The method as recited in claim 1 further comprising the step of performing on said coded signal a weighting function to produce said results (X) of said digital signal processing computation.

5. The method as recited in claim 1 further comprising the steps of:

performing on said coded signal a weighting function to produce said results (X) of said digital signal processing computation;

performing on said coded signal a decision metrics;

multiplying said result of said scaling step with a result of said decision metrics function in advance of said outputting step.

6. The method as recited in claim 1, wherein said decoding is according to a Viterbi decoding.

7. The method as recited in claim 1, wherein said communication system is a Code Division Multiple Access communication system.

8. An apparatus for decoding a coded signal in a communication system, comprising:

means for scaling, according to a soft-limiting function f(X), results (X) of a digital signal processing computation of said coded signal;

means for outputting an scaled result of said means for scaling for decoding said coded signal;

wherein said soft limiting function f(X) is essentially equal to at least one of mathematical formula fA(X) and fB(X);

wherein said fA(X) is governed by:

$$fA(X) = X \qquad \text{if } X < \text{or} = M, \text{ and}$$

$$fA(X) = \frac{X + (\alpha 1 - 1) \cdot M}{\alpha} \qquad \text{if } X > M;$$

wherein said fB(X) is governed by:

$$fB(X) = X \qquad \text{if } X < \text{or} = M1,$$

$$fB(X) = \frac{X + (\alpha 1 - 1) \cdot M1}{\alpha 1} \qquad \text{if } X > M1, \text{ and}$$

$$fB(X) = \frac{X + (\alpha 2 - 1) \cdot M2}{\alpha 2} \qquad \text{if } X > M2;$$

wherein M, M1 and M2, and $\alpha$, $\alpha 1$ and $\alpha 2$ are finite numbers.

9. The apparatus as recited in claim 8 further comprising means for performing on said coded signal a decision metrics function to produce said results (X) of said digital signal processing computation.

10. The method as recited in claim 8 further comprising:

means for performing on said coded signal a weighting function to produce said results (X) of said digital signal processing computation;

means for performing on said coded signal a decision metrics;

means for multiplying said result of said means for scaling with a result of said decision metrics function in advance of said outputting step.

\* \* \* \* \*